(12) United States Patent
Zachesov

(10) Patent No.: US 10,152,407 B1
(45) Date of Patent: Dec. 11, 2018

(54) OPTIMIZATION OF ANALYSIS OF AUTOMATED TEST RESULTS

(71) Applicant: Ingram Micro Inc., Irvine, CA (US)

(72) Inventor: Dmitriy Zachesov, Moscow (RU)

(73) Assignee: Ingram Micro, Inc., Irvine, CA (US)

( * ) Notice: Subject to any disclaimer, the term of this patent is extended or adjusted under 35 U.S.C. 154(b) by 56 days.

(21) Appl. No.: 15/159,675

(22) Filed: May 19, 2016

(51) Int. Cl.
*G06F 11/00* (2006.01)
*G06F 11/36* (2006.01)

(52) U.S. Cl.
CPC ...... *G06F 11/3692* (2013.01); *G06F 11/3688* (2013.01)

(58) Field of Classification Search
CPC .................................................. G06F 11/3692
USPC .................. 714/38.1, 38.12, 38.13, 38.14, 26
See application file for complete search history.

(56) References Cited

U.S. PATENT DOCUMENTS

| | | | | |
|---|---|---|---|---|
| 2010/0058345 A1* | 3/2010 | Seidman | ............. | G06F 11/3419 718/101 |
| 2010/0153261 A1* | 6/2010 | Tseng | ..................... | G06Q 10/06 705/39 |
| 2010/0287541 A1* | 11/2010 | Saunders | ............... | G06Q 30/06 717/139 |
| 2011/0225461 A1* | 9/2011 | Wookey | ..................... | G06F 8/68 714/38.1 |
| 2015/0082326 A1* | 3/2015 | Milliron | .................. | G06F 9/542 719/318 |

* cited by examiner

*Primary Examiner* — Dieu Minh T Le
(74) *Attorney, Agent, or Firm* — Ice Miller LLP

(57) ABSTRACT

A large number of tests are performed on a service automation system. An algorithm for detecting redundant test failures is provided. Each failed automated test has a set of attributes that allow for determining a degree of similarity with previous failed tests. Each failed test generates an exception containing a message and a stack trace. A message, a stack trace, a screenshot and other attributes produced by the test at the point of failure are included into a knowledge base of failed tests. This data can be analyzed for determining a cause of the test failures. The actual cause, once determined, is saved into a database and linked to a particular test failure. In order to find the redundant test failures, the attributes of a current test failure are compared to corresponding attributes of the previous test failures. The redundant test results and their causes are discarded from further test analysis.

5 Claims, 6 Drawing Sheets

OPTIMIZATION OF ANALYSIS OF AUTOMATED TEST RESULTS

BACKGROUND OF THE INVENTION

Field of the Invention

This invention relates to a method for automated testing of a service automation system, and more particularly, to optimization of analysis of the test results.

Description of the Related Art

Service automation systems require large number of tests to be performed on each new build or a new version prior to it being given to end users. These tests are intended to detect all possible bugs and execution errors of a product. It is not unusual to have tens, or even hundreds of thousands of automated regressive and validation tests that need to be performed. Thus, it becomes very difficult and time consuming for the testers to determine the actual causes of a large number of failed tests.

Typically, several tests can fail due to the same problem. However, the tester who analyses the causes of the failed tests may require a long time to review all the failed tests results and to determine the actual common or unique causes of the failed tests. Additionally, if the causes of the previously failed tests have not been yet addressed by the developers by a new set of tests, the previous failed test result are still showing among the current failed tests and the testers will still spend time reviewing and analyzing all the redundant test results. Obviously, such a process is inefficient, given a large number of tests required. Therefore, it is desired to optimize the test results analysis process by detecting redundant or similar test failures and by identifying the previous causes of the failed tests that are still reproduced by the current tests.

Accordingly, an efficient method for optimization of analyzing of the test results is required.

SUMMARY OF THE INVENTION

Accordingly, the present invention is directed to a method for optimization of analysis of test results that substantially obviates one or more of the disadvantages of the related art.

In one aspect of the invention, large numbers of tests are performed on a service automation system. An algorithm for detecting redundant test failures is provided. Each failed automated test has a set of attributes that allow for determining a degree of similarity with previous failed tests. Each failed test generates an exception containing a message and a stack trace. The automated test that checks the application (i.e., product) user interface (UI) can contain a screenshot reflecting a state of the UI at the point of test failure (i.e., an error).

According to an exemplary embodiment, a message, a stack trace, a screenshot and other attributes produced by the test at the point of failure are included into a knowledge base of failed tests. This data can be analyzed for determining a cause of the test failures. The actual cause, once determined, is saved into a database and linked to a particular test failure. In order to find the redundant test failures, the attributes of a current test failure are compared to corresponding attributes of other previous test failures. The redundant test results and their causes are discarded from further test analysis.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings:

FIG. 3 illustrates a screen shot of test results depicting a stack traces of failed test portions, in accordance with the exemplary embodiment;

FIG. 5 illustrates a screen shot of stack traces with descriptions of failed test portions, in accordance with the exemplary embodiment;

DETAILED DESCRIPTION OF THE PREFERRED EMBODIMENTS

Figure 1:
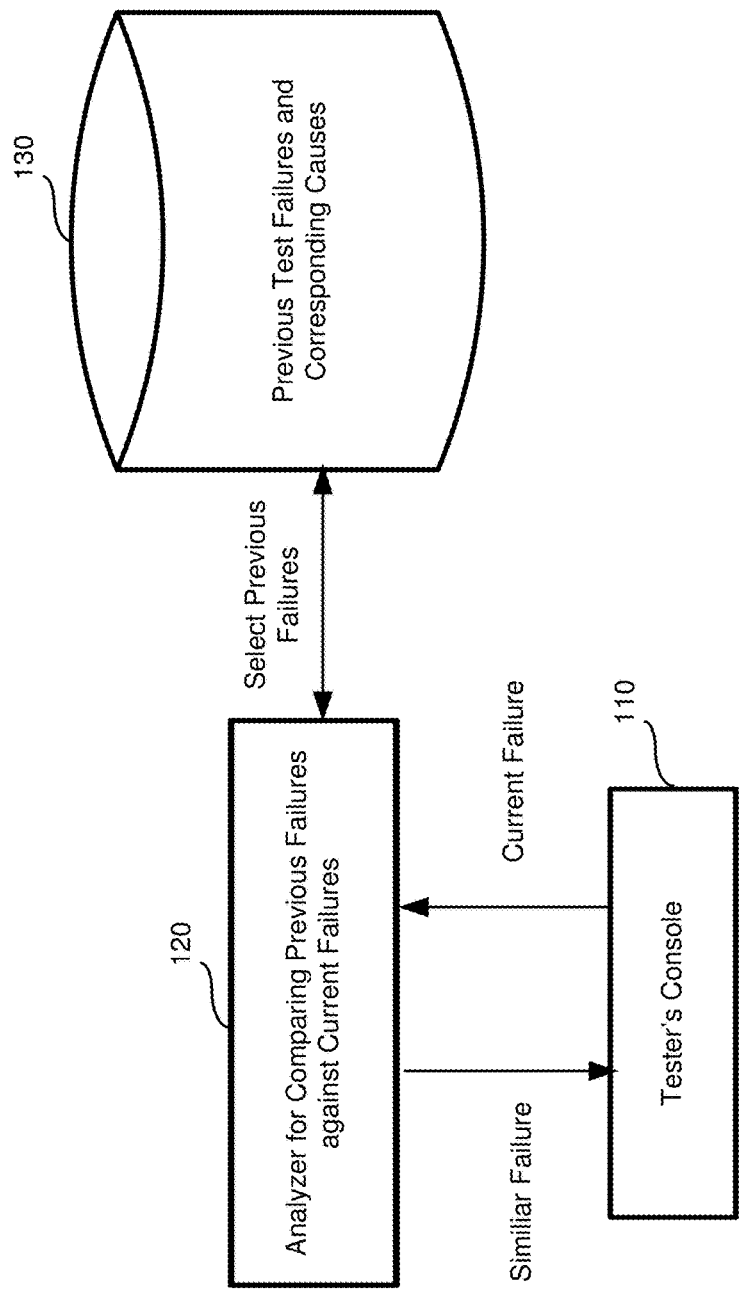
FIG. 1 illustrates a test results optimization system, in accordance with the exemplary embodiment.

Reference will now be made in detail to the preferred embodiments of the present invention, examples of which are illustrated in the accompanying drawings.

In one embodiment, a large number of tests are performed. An algorithm for detecting redundant test failures is provided. Each failed automated test has a set of attributes that allow for determining a degree of similarity with other failed tests. Each failed test generates an exception containing a message and a stack trace. The automated test that checks the application (i.e., product) UI can contain a screenshot reflecting a state of the UI at the point of test failure (i.e., an error).

According to an exemplary embodiment, a message, a stack trace, a screenshot and other attributes produced by the test at the point of failure are included into a knowledge base of failed tests. Test logs can be used as attributes as well. The test logs can also be analyzed in order to find redundant test failures and their causes. Additionally, the logs produced in response to test actions within the tested product can be compared. This data can be analyzed for determining a cause of the test failures. The actual cause, once determined, is saved into a database and linked to a particular test failure. In order to find the redundant test failures, all attributes of a current test failure need to be compared to corresponding attributes of other previous test failures. According to the exemplary embodiment, each attribute is assigned a coefficient from 0 to 1 reflecting the importance (i.e., a weight) of this attribute in the test failure.

The coefficients are important for better accuracy of determination of the redundant failures and corresponding redundant causes. The weight coefficient can be assigned to screenshots and test log attributes as well. The weight coefficients indicated the degrees of similarity to other corresponding attributes. For example, a message attribute has a weight coefficient 0.6 and the stack trace attribute has a weight coefficient 0.2. Thus, the message attribute has more weight in determining the degree of similarity. Other attributes (logs and screenshots) can have aggregate weights of 0.2 assigned. The weights are set by a tester depending on the nature of the product to be tested.

Different test failures can have different messages, but almost identical stack traces. The message tends to be a more important attribute than the stack trace. Thus, priority is given to the failures having very similar (or identical) messages. The textual attributes such as a message and a stack trace can be compared using different methods, such as determining a Damerau-Levenshtein distance:
https:***en.wikipedia.org/wiki/Damerau%E2%80%93Levenshtein_distance) or by calculating the Dice coefficient:
(https:***en.wikibooks.org/wiki/Algorithm_Implementation/Strings/Dice%27s_co efficient).

According to the exemplary embodiment, the text is represented as a bag-of-words model—i.e., the text is converted into a vector. Then, a matrix of all the vectors is created.

In order to convert the message attribute text into a vector, the following operations are performed:

1. The text is cleared from punctuation marks, frequently used words, articles and prepositions;
2. A number of unique words in the text of messages' attributes from all test failures in the knowledge database, including the new failed test, are calculated. This numbers defines a vector dimension; and
3. A number of redundant words in the text are calculated. This number defines a vector coordinate.

In order to compare a new failed test against previous failed tests, the following operations are performed:

1. The message attribute of all previously failed tests are converted into vectors $x(1), x(2) \ldots x(n)$, where n Represents the number of failed tests. Each vector has a vector dimension m, where m is the number of unique words in the text of messages' attributes from all test failures in the knowledge database, including the new failed test. All vectors of a smaller size can be increased to a required size m by adding zeros into positions of missing words;
2. The message attribute of the new failed test is presented as a vector y of a dimension m;
3. Cosines of the angles between each of the vectors $x(1), x(2) \ldots x(n)$ and y are calculated as:

$$k(x, y) = \frac{xy^-}{\|x\|\|y\|},$$

Where x and y are the vectors, k—a resulting cosines and $\|x\|$ and $\|y\|$ are modulo of vectors x and y.

The resulting cosines $k(1), k(2) \ldots k(n)$ reflects a coefficient of similarity of message attribute of the new failed test is presented as a vector y with other message attribute of failed tests, presented as vectors $x(1) \ldots x(n)$.

4. As one example, to reduce the amount of calculation required, the test failures with a highest coefficient of similarity by message is selected from the $k(1) \ldots k(n)$;
5. The similarity coefficients are calculated in the same manner for the stack traces for the selected above tests.
6. In order to create a similarity coefficients for the messages and the stack traces, the aggregated coefficient including the weights of the test attributes is calculates between new failure test and each as:

$$WX*KX+WY*KY,$$

where WX is a message attribute weight, KX—is a similarity coefficients for messages, WY—a stack trace attribute weight, KY—a similarity coefficients for stack traces.

7. The highest coefficient is selected from the above coefficients. The index of this coefficient indicates the closest failed test. The coefficient indicates the probability of coincidence of the failed tests.

As one example of an attribute, the screenshots can be used for this purpose. To represent an image in the form of a vector and to search for similar images, the following can be done. Each digital image is represented as a set of pixels that have a specific color. The color of the pixels can be represented in a particular color model, for example, RGB, HSV/HSB and others. Consider the user of the HSV (Hue, Saturation, Value) model to represent the color. Let the color of each pixel be represented using HSV, and a matrix is generated in the form of N×3, where N is the number of pixels in the image. To find areas that are different, in the image, and to generally assess how different two images are, for the HSV model it is sufficient to use just the H (hue) parameter. Thus, the image is represented by a hue matrix N×1.

A one-dimensional matrix can be represented as a vector of a size N (i.e., the number of the pixels in the image) with end coordinates H from the HSV model.

All the screenshots generated by the tests have the same size, therefore, all the screenshots can be represented as vectors. Since all the images are represented as vectors, the search for the most similar ones can be done in the same manner as the search based on other attributes of the test failure.

Thus, the closest (if not identical) previous failed test to the current failed test with its corresponding cause can be identified. Therefore, it can be concluded (with the calculated probability of coincidence) that the current failed test has the same cause as the previous failed test. Accordingly, the tester's time required to analyze the current failed test and to determine the cause of failure can be saved, since the cause is the same as the one of the previously failed test.

FIG. 1 illustrates a test results optimization system, in accordance with the exemplary embodiment. A tester console 110 runs a test and generates a current failure. The current failure is provided to an analyzer module 120, where it is compared against previous failures acquired from a database 130 containing previous failures and corresponding causes. The analyzer module 120 finds a similar or identical failure to the current failure and provides it to the tester console 110, so the tester can record the corresponding cause of the failure as the cause of the current failure.

Figure 2:
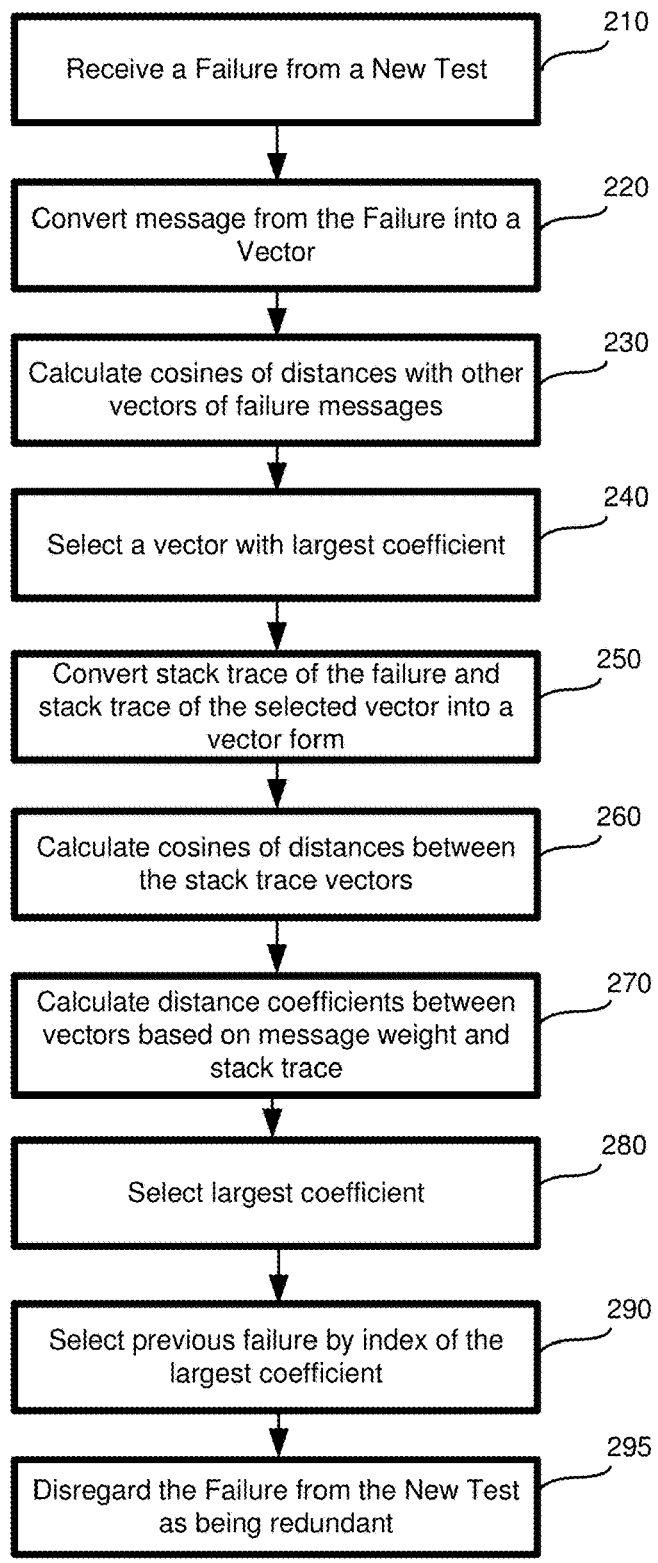
FIG. 2 illustrates a flowchart of a method for optimization of analysis of the automated test results, in accordance with the exemplary embodiment.

FIG. 2 illustrates a flowchart of a method for optimization of analysis of the automated test results, in accordance with the exemplary embodiment. In step 210, the process runs a test and receives a new failed test data. A message attribute from the failed test is converted into a vector form in step 220. The process calculates cosines (i.e., coefficients) of distances with other vectors of previous failure messages stored in a knowledge database in step 230. A vector with the largest coefficient is selected in step 240. In step 250, the process converts a stack trace attribute of the failed test and the stack trace attribute of the selected vector into a vector form. Then, in step 260, the process calculates cosines of distances between the stack trace vectors from step 250.

In step 270, the process calculates aggregate distance coefficients between vectors based on the message weight and the stack trace. The largest coefficient is selected in step 280. Then, the process selects a previous failure by index of the largest coefficient in step 290. In other words, the process selects the previously failed test having the most similar attributes and the cause of the failure to the current failed test. Thus, in step 295, the process disregards the failure from the current test as being redundant and, therefore, not relevant in terms of determination of its cause. In one embodiment, the degree of similarity can be set at a certain percentage value. Then, if the failed test falls below this value, it is not shown as a redundant and needs to be analyzed more closely by the tester. However, if the degree of similarity is greater or equal to the threshold (e.g., 70%, or 90%, or 95%), the failed test is considered to be redundant and is discarded from further analysis.

Figure 3:
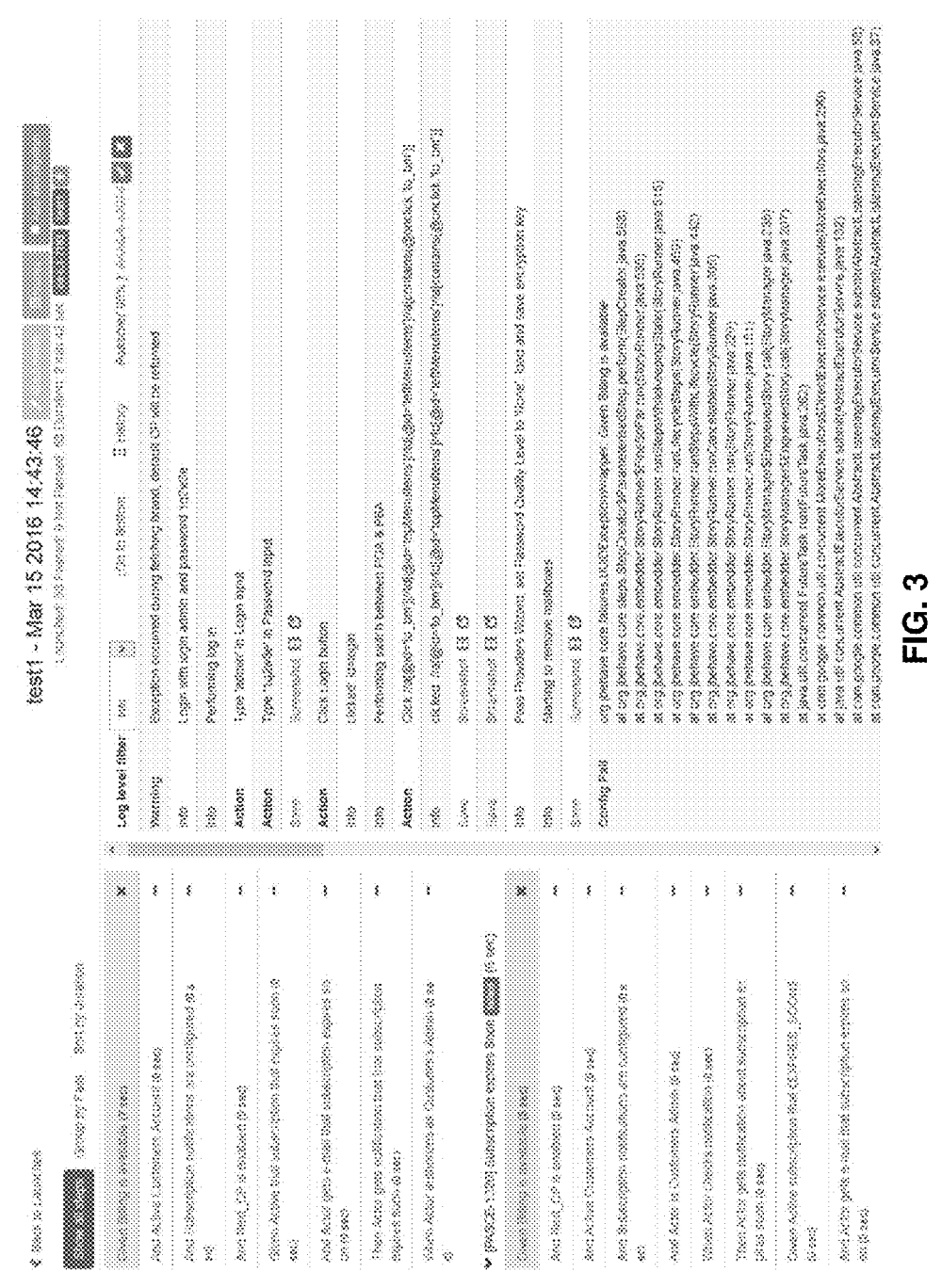

FIG. 3 illustrates a screen shot of test results depicting stack traces of failed test portions, in accordance with the exemplary embodiment. This test shows configuration failure. The degree of similarity to the pervious failure is 96% in this example.

Figure 4:
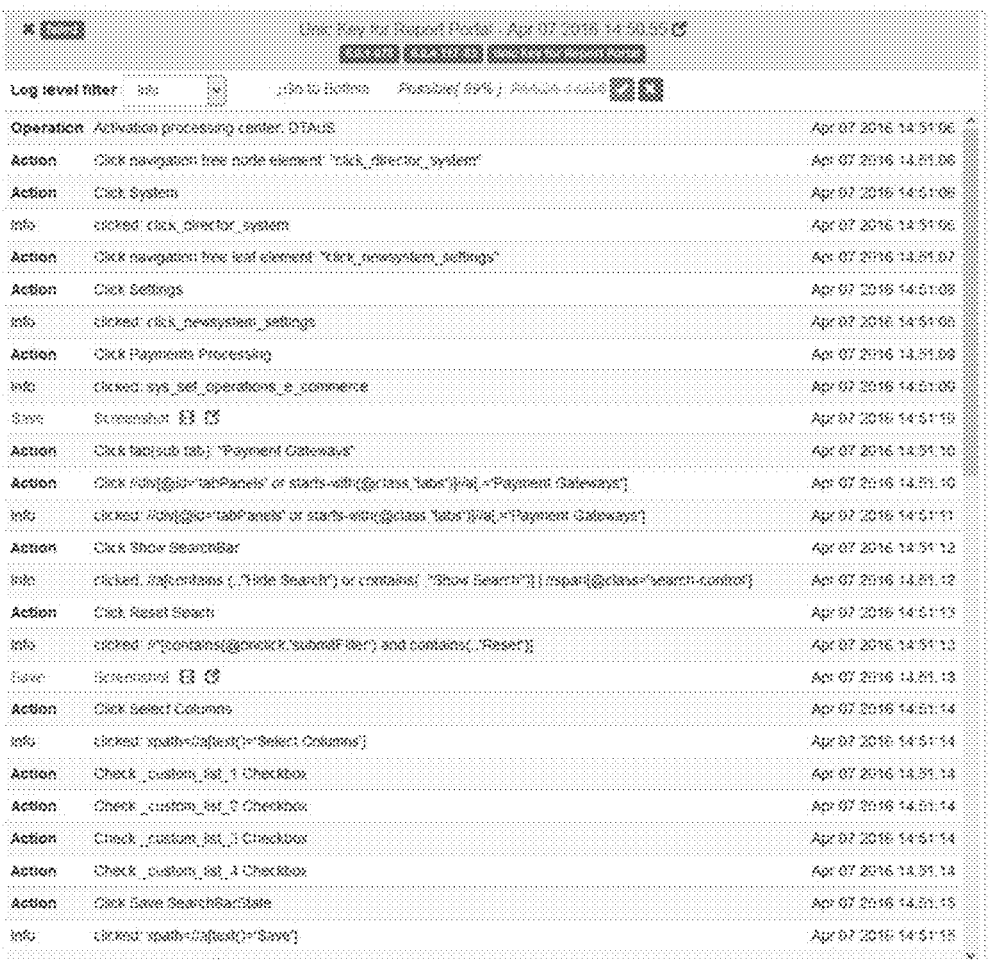
FIG. 4 illustrates screen shots of navigation tree test logs depicting actions performed by the test, in accordance with the exemplary embodiment.

FIG. 4 illustrates screen shots of navigation tree test logs depicting actions performed by the test, in accordance with the exemplary embodiment. It shows a log of failed test with 99% probability of it being a redundant failure based on message and stack trace analysis and screenshots. The cause of failure is shown next to the degree of similarity (i.e., 99%). In this example the failure cause code is PAAQA 14256. The tester can have an option of manually entering the cause of failure and his assessment of the failure.

Figure 5:
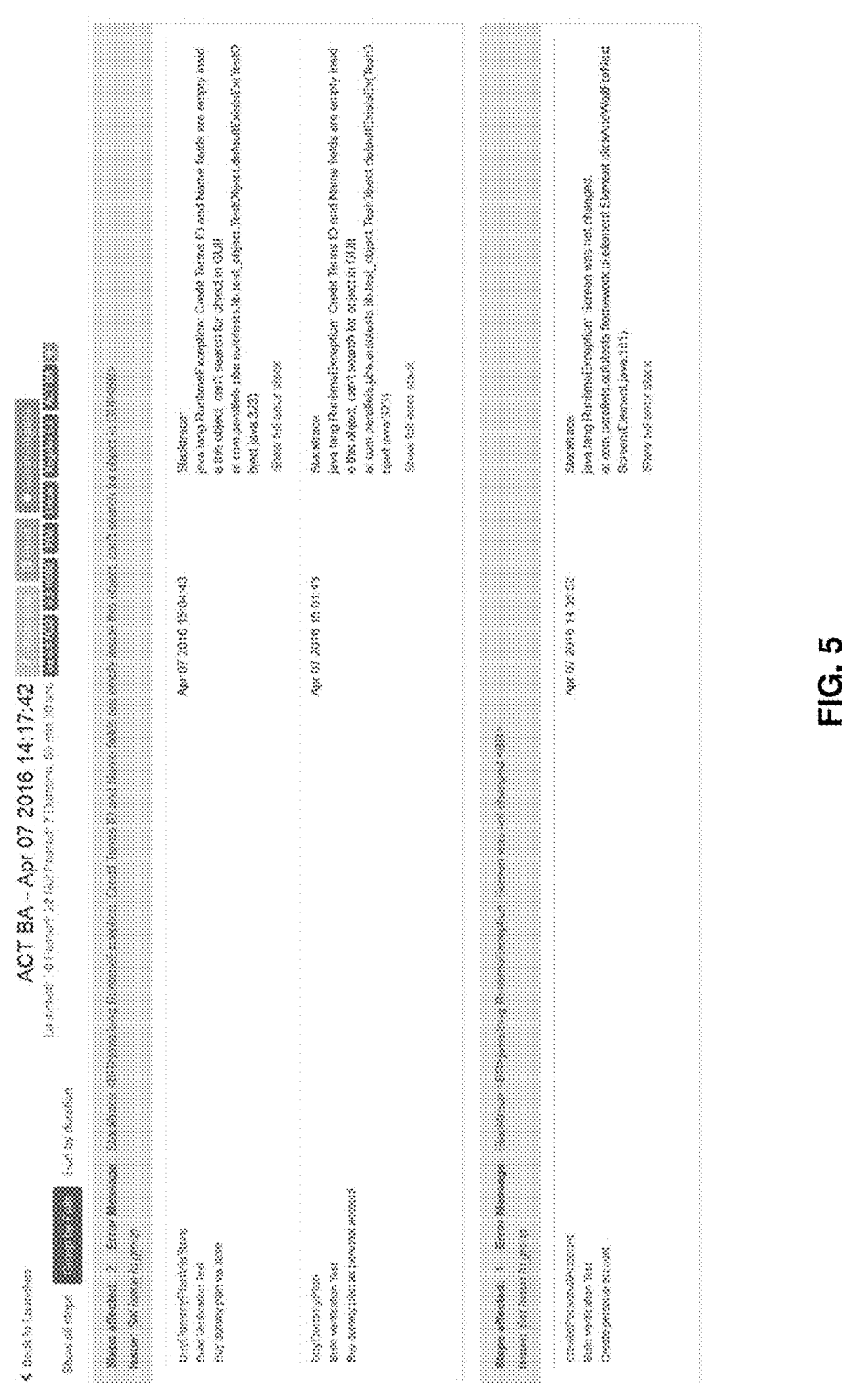

FIG. 5 illustrates a screen shot of stack traces with descriptions of failed test portions, in accordance with the exemplary embodiment. This screen shot also illustrates that the error stack traces can be separated by groups by similar causes (i.e., by degrees of similarity with the pervious failed tests). In this example, two groups of failures are shown. The first group has two failure cases (i.e., steps) and the other group has one failed case.

Figure 6:
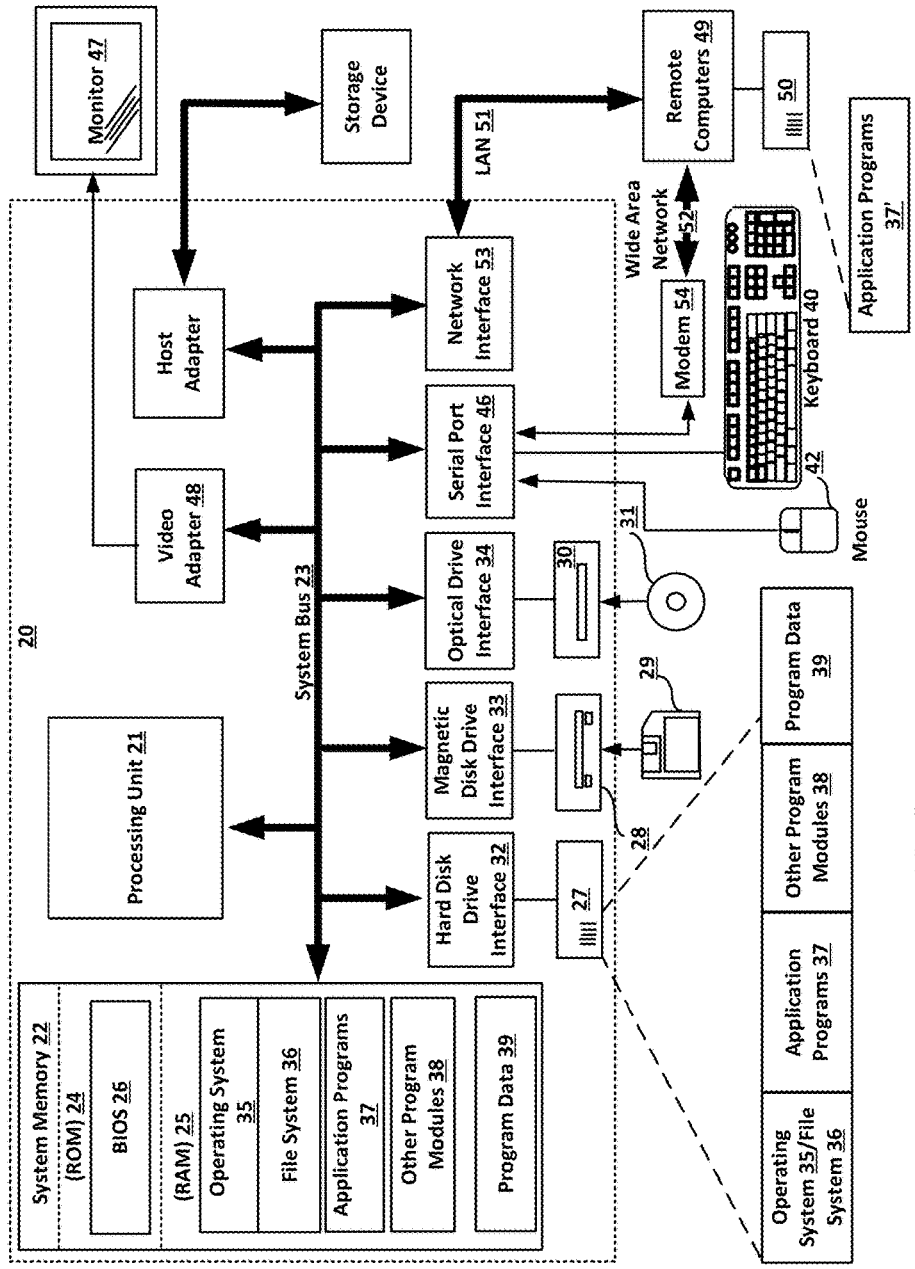
FIG. 6 illustrates an exemplary computer system that can be used for implementing the invention.

With reference to FIG. 6, an exemplary system for implementing the invention includes a general purpose computing device in the form of a computer system 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and system have been achieved. It should also be appreciated that various modifications, adap- tations, and alternative embodiments thereof may be made within the scope and spirit of the present invention. The invention is further defined by the following claims.

What is claimed is:

1. A method for automated optimization of analysis of test results, the method comprising:
   (a) assembling a knowledge base of previous failed tests' attributes and corresponding failed tests' causes;
   (b) assigning weights to each of the attributes;
   (c) executing a test on a service automation system;
   (d) receiving current failed test attributes;
   (e) converting a current failed test first attribute into a vector form, wherein the vector's dimension is defined by a number of unique words in attributes descriptions of both previous and current failed tests and coordinates are defined by a number of redundant unique words found in the attribute description;
   (f) calculating cosines of distances from the current failed first attribute vector to each of the previous failed first attribute vectors acquired from the knowledge base, wherein the cosines serve as coefficients of a degree of similarity of the failed tests' first attributes;
   (g) determining a weighted degree of the similarity of the failed tests' first attributes by multiplying the coefficients of a degree of similarity of the first attribute by its corresponding weight;
   (h) repeating steps (e)-(g) for remaining attributes;
   (i) selecting a most similar of the previous failed tests' attributes from the knowledge base by an index based on a largest aggregated weighted degree of the similarity by current failed test attributes; and
   (j) disregarding a current failed test cause from test analysis, as being redundant to a previous failed test cause associated with the most similar of the previous failed tests' attributes based on the aggregated weighted degree of the similarity.

2. The method of claim 1, wherein the test attributes are any of:
   test failure messages;
   test failure stack traces; and
   test execution logs.

3. The method of claim 1, further comprising clearing a message attribute from articles, prepositions and non-alphabetical symbols.

4. The method of claim 1, further comprising generating vectors of screenshots of test failures utilizing a hue attribute of an HSV model and using the hue attribute as a summand of aggregated weighted degree of the similarity of the current failed test and previous failed tests' data from the knowledge base.

5. A system for automated optimization of analysis of software test results, the system comprising:
   a tester console configured to run a plurality of automated tests on a service automation system;
   a knowledge database configured to store test failure results in a form of screenshots and corresponding failure causes; and
   an analyzer module in communication with the tester console and configured to perform automatic optimization of test analysis and to provide current test failure results to the knowledge database,
   wherein:
   the analyzer module receives screenshots of current test failure results from the tester console and compares them against screenshots of previous test failure results acquired from the knowledge database; and
   the analyzer module provides to the tester console a probability of similarity value of a previous test failure cause to the current test failure cause,
   wherein the analyzer module uses a hue parameter of an HSV model, generates vectorized representations of the screenshots based on the hue parameter, and calculates cosines of distances from vectors of the current screenshot to vectors of each of the previous failed screenshots acquired from the knowledge base, wherein the cosines serve as coefficients of a degree of similarity.

* * * * *